Patented Mar. 4, 1930

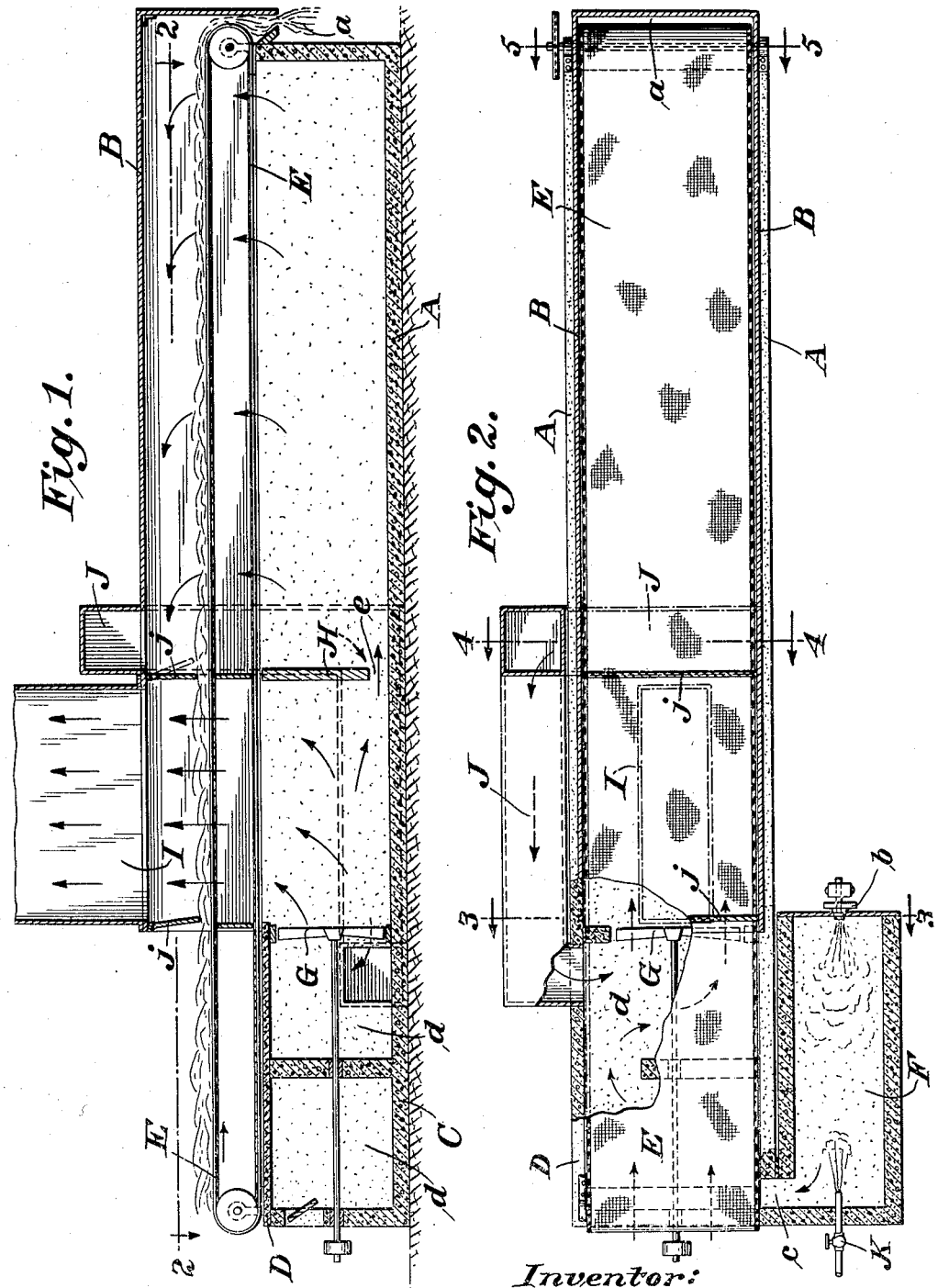

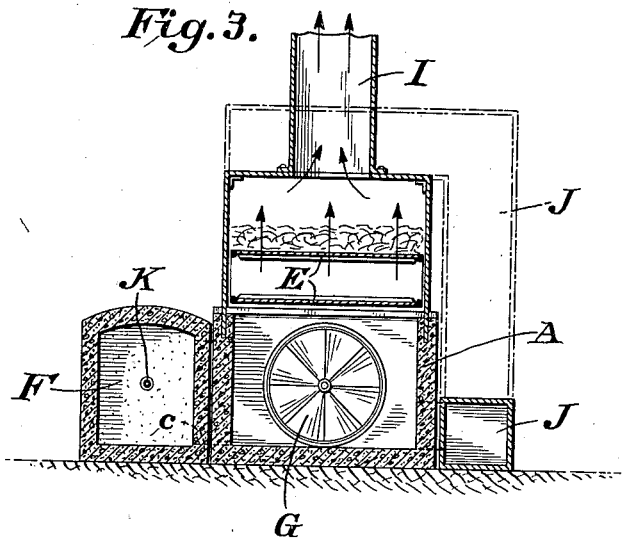
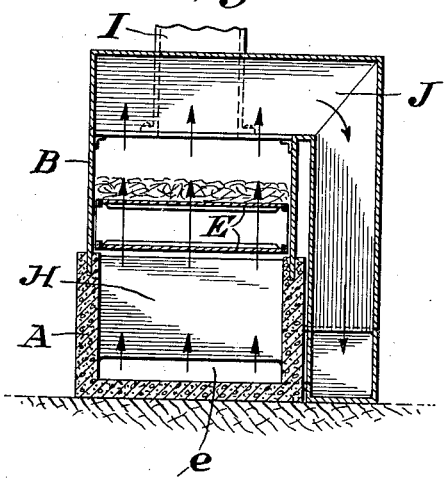
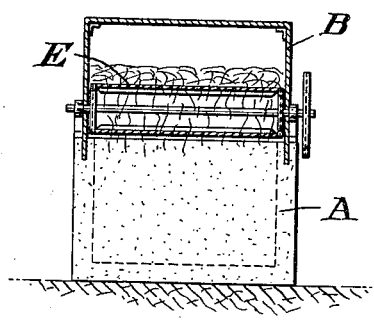

1,749,451

UNITED STATES PATENT OFFICE

WILLIAM M. STRONG, OF SANTA BARBARA, CALIFORNIA, ASSIGNOR TO GENERAL DRYING ENGINEERING CORPORATION

DRYING APPARATUS

Application filed April 17, 1928. Serial No. 270,787.

The invention consists in an apparatus for drying material. I have shown it of a form particularly adapted for drying alfalfa, but it may be used for many other materials.

In particular the invention consists in first entering the green material at the hot end of the drying tunnel, passing through the material highly heated air of suitable relative humidity and then further drying by passing heated air through the material at lower velocity. Further in carrying out this invention the apparatus comprises a carrier in a housing, a source of hot air, a means of humidity control, a fan for moving the air beneath the carrier, and an arrangement whereby a large part of the heated air is passed directly through the material and the moist air allowed to escape, while heated air is conveyed beneath the remainder of the run of the conveyer and passes through the material at a lower velocity to complete the drying.

In the drawing Fig. 1 is a central vertical longitudinal section through the drier.

Fig. 2 is a horizontal section on line 2—2 of Fig. 1.

Fig. 3 is a diagrammatic cross section on line 3—3, of Figure 2.

Fig. 4 is a similar section on line 4—4 of Figure 2, and

Fig. 5 is a similar section on line 5—5 of Figure 2.

I employ a long drying tunnel which I preferably construct of a concrete base section A, and an upper top section B. The top section is preferably made of sheet metal reinforced by angle iron and covered by suitable insulating material.

The base section A has an extension C with a cover D.

On this extension may be supported one end of the endless conveyer E, which is of the chain or wire mesh fabric type and is driven by any suitable motor, not shown. This conveyer extends through the entire length of the drying tunnel thus described and at the far end discharges the material from the port $a$.

Beside the extension C, is shown a furnace F shown as heated by an oil burner $b$. This furnace is connected by the passage $c$ with the chamber $d$ of the extension. At the forward end of the chamber $d$ is a fan G which blows the heated air from the furnace beneath the endless conveyer.

H is a baffle wall a comparatively short and suitable distance in front of the fan, across the tunnel, which deflects the main body of heated air upward through the conveyor and out through a stack outlet I, extending above the conveyor. Above the conveyor are the flaps $j$, to allow the material to pass and maintain a substantially closed outlet for the moist air.

At the base of the baffle wall H is a port $e$ for allowing part of the heated air to pass into the main body of the tunnel beneath the conveyor, from whence it passes upward through the material thereon, at a much slower velocity than the air passes through the initial drying section.

After passing through the material this lower velocity air is preferably returned to the fan intake, and this may be done by the return flue J, which preferably leads from the forward end of the top of the tunnel back to the chamber $d$.

This is desirable as it recirculates heated air still capable of drying, also it gives desired moisture in the air fed by the fan so that the material will not be burned.

For the uniform control or equalization of the humidity of the heated air, circulated by the fan, I have shown a water atomizer or steam jet K blowing into the furnace chamber and providing independent humidity control.

In use, the material is fed upon and leveled on the initial run of the carrier, above the extension C. It then passes to the initial drying section where the heated air is blown beneath and through it, a large part of the moisture being taken out and carried away through the stack I. As the material leaves this chamber and passes into the remainder of the tunnel the hot air entering through the port $e$ beneath the carrier passes through and completes the drying.

What I claim as my invention is:

1. In a drying apparatus, the combination of a conveyor, a casing enclosing the conveyor with an air chamber above and below, a source of heated air supply, a fan beneath the conveyor at the inlet end, an outlet for moist air above the initial section of the conveyor and means for passing heated air through the material beyond this initial section more slowly than through the material in the initial section.

2. In a drying apparatus, the combination of a conveyor, a casing enclosing the conveyor with an air chamber above and below, a source of heated air supply fed beneath the conveyor at the inlet end, an outlet for moist air above the initial section of the conveyor, a partition separating the initial section of the air chamber from the anterior portion, said partition having a port below the conveyor for heated air and an outlet from the upper air chamber.

3. In a drying apparatus, the combination of a conveyor, a casing enclosing the conveyor, with an air chamber above and below, a source of heated air supply fed beneath the conveyor at the inlet end, an outlet for moist air above the initial section of the conveyor, a partition separating the initial section of the air chamber from the anterior portion, said partition having a port below the conveyor and a return connection between the initial part of the anterior upper air chamber and the inlet for the heated air.

4. In a drying apparatus, the combination with a conveyor for material to be dried, of a casing enclosing said conveyor and having an air chamber above and below said conveyor, said casing being provided at one end with an extension and provided at its opposite end with a material outlet, a source of heated air at one side of and in communication with said casing extension, a stack outlet for the heated air above said conveyor adjacent to said extension, and means for drawing heated air from the extension and blowing it into the casing below the conveyor at a point in substantially vertical alignment with said stack outlet.

5. In a drying apparatus, the combination with a conveyor for material to be dried, of a casing enclosing said conveyor and having an air chamber above and below said conveyor, said casing being provided at one end with an extension and provided at its opposite end with a material outlet, a source of heated air at one side of and in communication with said casing extension, a stack outlet for heated air above said conveyor adjacent to said extension, means for drawing heated air from said extension and blowing it into said casing below the conveyor at a point adjacent to said stack outlet, and means substantially in the vertical plane of a wall of said stack outlet for deflecting the main body of heated air upwardly through said conveyor and out through the stack outlet but allowing the remainder of said heated air to pass beneath the conveyor toward the material outlet aforesaid.

6. In a drying apparatus, the combination with a conveyor for material to be dried, of a casing enclosing said conveyor, provided at one end with an extension and provided at its opposite end with a material outlet, a furnace in which air is adapted to be heated located at one side of and in communication with said casing extension, means for drawing heated air from the extension and blowing it into the casing below the conveyor, means for deflecting the main body of heated air upwardly through said conveyor but allowing the remainder of the heated air to pass beneath the conveyor toward the material outlet, and means for returning to said extension the last mentioned heated air after it has passed beneath the conveyor.

7. In a drying apparatus, the combination with a conveyor for material to be dried, of a casing enclosing the conveyor, provided at one end with an extension and provided at its opposite end with a material outlet, a furnace in which air is adapted to be heated located at one side of and in communication with said casing extension, a steam jet opening into said furnace, means for drawing heated air and steam from the extension and blowing it into the casing below the conveyor, and means for deflecting the main body of air and steam upwardly through said conveyor but permitting the remainder of such heated air and steam to pass beneath the conveyor toward said material outlet.

In testimony whereof I affix my signature.

WILLIAM M. STRONG.